United States Patent
Lingaiah et al.

(10) Patent No.: US 11,652,754 B2
(45) Date of Patent: May 16, 2023

(54) SMART BANDWIDTH ALLOCATION

(71) Applicant: ARRIS Enterprises LLC, Suwanee, GA (US)

(72) Inventors: Lokesh Lingaiah, Bangalore (IN); Manjunatha Narasimhamurthy, Bangalore (IN); Santhosha Devasya, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/571,864

(22) Filed: Jan. 10, 2022

(65) Prior Publication Data

US 2022/0224655 A1 Jul. 14, 2022

Related U.S. Application Data (60) Provisional application No. 63/135,962, filed on Jan. 11, 2021.

(51) Int. Cl.
*H04L 47/52* (2022.01)
*H04L 47/2425* (2022.01)
(Continued)

(52) U.S. Cl.
CPC ........ *H04L 47/522* (2013.01); *H04L 47/2433* (2013.01); *H04L 47/2475* (2013.01); *H04L 47/6275* (2013.01); *H04L 47/805* (2013.01)

(58) Field of Classification Search
CPC ............. H04L 12/2829; H04L 12/2834; H04L 47/2433; H04L 47/2441; H04L 47/2475;
(Continued)

(56) References Cited

U.S. PATENT DOCUMENTS 7,542,440 B2 * 6/2009 Rajkotia ............. H04L 47/2441
455/452.2
9,001,748 B2 * 4/2015 Park ....................... H04W 28/02
455/450
(Continued)

FOREIGN PATENT DOCUMENTS

EP 2 560 332 2/2013

OTHER PUBLICATIONS

International Search Report and Written Opinion of the International Searching Authority dated Apr. 19, 2022 in International (PCT) Application No. PCT/US2022/011779.
(Continued)

*Primary Examiner* — Robert J Lopata
(74) *Attorney, Agent, or Firm* — Wenderoth, Lind & Ponack, L.L.P.

(57) ABSTRACT

A controller is provided for use with a CD, a WAN, and a service provider server, the HNC includes: a memory; and a processor configured to execute instructions stored on memory to cause the HNC to: establish a priority time period; associate the priority time period with a first application; establish a first service flow queue having a first QoS during priority period; establish a second service flow queue having a second QoS; receive first upstream packets and second upstream packets; assign the first upstream packets to a first upstream queue during the priority time period; assign the second upstream packets to a second upstream queue; receive first downstream packets and second downstream packets; assign the first downstream packets to a first downstream queue during the priority time period; and assign the second downstream packets to a second downstream queue.

9 Claims, 9 Drawing Sheets

(51) Int. Cl.
*H04L 47/2475* (2022.01)
*H04L 47/6275* (2022.01)
*H04L 47/80* (2022.01)

(58) Field of Classification Search
CPC ... H04L 47/28; H04L 47/522; H04L 47/6275; H04L 47/803; H04L 47/805; H04L 47/826
USPC .......................................................... 370/329
See application file for complete search history.

(56) References Cited

U.S. PATENT DOCUMENTS

| | | | |
|---|---|---|---|
| 2015/0326481 A1* | 11/2015 | Rector | H04W 8/04 370/236 |
| 2018/0063857 A1 | 3/2018 | Caplan | |
| 2018/0102984 A1* | 4/2018 | Dettori | H04L 47/82 |
| 2018/0176816 A1* | 6/2018 | Meylan | H04L 47/6215 |
| 2019/0158371 A1* | 5/2019 | Dillon | H04L 47/196 |
| 2019/0190843 A1* | 6/2019 | Bastable | H04L 47/24 |
| 2020/0167189 A1 | 5/2020 | Anand et al. | |
| 2020/0196182 A1* | 6/2020 | Nam | H04W 84/12 |
| 2020/0296046 A1* | 9/2020 | Liu | H04L 47/2433 |
| 2020/0367262 A1* | 11/2020 | Trank | H04W 4/90 |
| 2022/0417569 A1* | 12/2022 | O'Tuama | H04L 47/6275 |

OTHER PUBLICATIONS

Anonymous, "How to Use Bandwidth Limit", DrayTek, May 2016, 9 pages, XP055909220, URL: https://www.draytek.com/support/knowledge-base/5782#drayos.

* cited by examiner

SMART BANDWIDTH ALLOCATION

BACKGROUND

Embodiments of the invention relate to bandwidth allocation within a local area network.

SUMMARY

Aspects of the present invention are drawn to a home network controller for use with a client device, a wide area network ("WAN"), and a service provider server, the client device being configured to transmit first upstream packets associated with a first application, and to transmit second upstream packets associated with a second application, the service provider server being configured to receive the first upstream packets, to receive the second upstream packets, to transmit first downstream packets associated with the first application, and to transmit second downstream packets associated with the second application, the client device being additionally configured to receive the first downstream packets, and to receive the second downstream packets, the home network controller including: a memory; and a processor configured to execute instructions stored on the memory to cause the home network controller to: establish a priority time period; associate the priority time period with the first application; establish a first upstream queue having a first quality of service during the priority time period; establish a second upstream queue having a second quality of service that is different from the first quality of service during the priority time period; establish a first downstream queue having the first quality of service during the priority time period; establish a second downstream queue having the second quality of service during the priority time period; receive the first upstream packets and the second upstream packets; assign the first upstream packets to the first upstream queue during the priority time period; assign the second upstream packets to the second upstream queue during the priority time period; receive the first downstream packets and the second downstream packets; assign the first downstream packets to the first downstream queue during the priority time period; and assign the second downstream packets to the second downstream queue during the priority time period.

In some embodiments, the processor is configured to execute instructions stored on the memory to cause the home network controller further to assign the first upstream packets to the first upstream queue during the priority time period by way of a deep packet inspection protocol.

In some embodiments, the processor is configured to execute instructions stored on the memory to cause the home network controller further to: assign the first upstream packets and the second upstream packets to a same one of the first upstream queue and the second upstream queue during a non-priority time period that is not during the priority time period; and assign the first downstream packets and the second downstream packets to the same one of the first downstream queue and the second downstream queue during the non-priority time period.

Other aspects of the present disclosure are drawn to a method of using a home network controller with a client device, a wide area network ("WAN"), and a service provider server, the client device being configured to transmit first upstream packets associated with a first application, and to transmit second upstream packets associated with a second application, the service provider server being configured to receive the first upstream packets, to receive the second upstream packets, to transmit first downstream packets associated with the first application, and to transmit second downstream packets associated with the second application, the client device being additionally configured to receive the first downstream packets, and to receive the second downstream packets, the method including: establishing, via a processor configured to execute instructions stored on a memory, a priority time period; associating, via the processor, the priority time period with the first application; establishing, via the processor, a first upstream queue having a first quality of service during the priority time period; establishing, via the processor, a second upstream queue having a second quality of service that is different from the first quality of service during the priority time period; establishing, via the processor, a first downstream queue having the first quality of service during the priority time period; establishing, via the processor, a second downstream queue having the second quality of service during the priority time period; receiving, via the processor, the first upstream packets and the second upstream packets; assigning, via the processor, the first upstream packets to the first upstream queue during the priority time period; assigning, via the processor, the second upstream packets to the second upstream queue during the priority time period; receiving, via the processor, the first downstream packets and the second downstream packets; assigning, via the processor, the first downstream packets to the first downstream queue during the priority time period; and assigning, via the processor, the second downstream packets to the second downstream queue during the priority time period.

In some embodiments, the method further assigns, via the processor, the first upstream packets to the first upstream queue during the priority time period by way of a deep packet inspection protocol.

In some embodiments, the method further: assigns, via the processor, the first upstream packets and the second upstream packets to a same one of the first upstream queue and the second upstream queue during a non-priority time period that is not during the priority time period; and assigns, via the processor, the first downstream packets and the second downstream packets to the same one of the first upstream queue and the second upstream queue during the non-priority time period.

Other aspects of the present disclosure are drawn to A non-transitory, computer-readable media having computer-readable instructions stored thereon, the computer-readable instructions being capable of being read by a home network controller for use with a client device, a wide area network ("WAN"), and a service provider server, the client device being configured to transmit first upstream packets associated with a first application, and to transmit second upstream packets associated with a second application, the service provider server being configured to receive the first upstream packets, to receive the second upstream packets, to transmit first downstream packets associated with the first application, and to transmit second downstream packets associated with the second application, the client device being additionally configured to receive the first downstream packets, and to receive the second downstream packets, wherein the computer-readable instructions are capable of instructing the home network controller to perform the method including: establishing, via a processor configured to execute instructions stored on a memory, a priority time period; associating, via the processor, the priority time period with the first application; establishing, via the processor, a first upstream queue having a first quality of service during the priority time period; establishing, via the processor, a second upstream queue having a second quality of service that is different from the first quality of service during the priority time period; establishing, via the processor, a first downstream queue having the first quality of service during the priority time period; establishing, via the processor, a second downstream queue having the second quality of service during the priority time period; receiving, via the processor, the first upstream packets and the second upstream packets; assigning, via the processor, the first upstream packets to the first upstream queue during the priority time period; assigning, via the processor, the second upstream packets to the second upstream queue during the priority time period; receiving, via the processor, the first downstream packets and the second downstream packets; assigning, via the processor, the first downstream packets to the first downstream queue during the priority time period; and assigning, via the processor, the second upstream packets to the second downstream queue during the priority time period.

In some embodiments, the computer-readable instructions are capable of instructing the home network controller to perform the method further including assigning, via the processor, the first upstream packets to the first upstream queue during the priority time period by way of a deep packet inspection protocol.

In some embodiments, the computer-readable instructions are capable of instructing the home network controller to perform the method further including: assigning, via the processor, the first upstream packets and the second upstream packets to a same one of the first upstream queue and the second upstream queue during a non-priority time period that is not during the priority time period; and assigning, via the processor, the first downstream packets and the second downstream packets to the same one of the first upstream queue and the second upstream queue during the non-priority time period.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Figure 1:
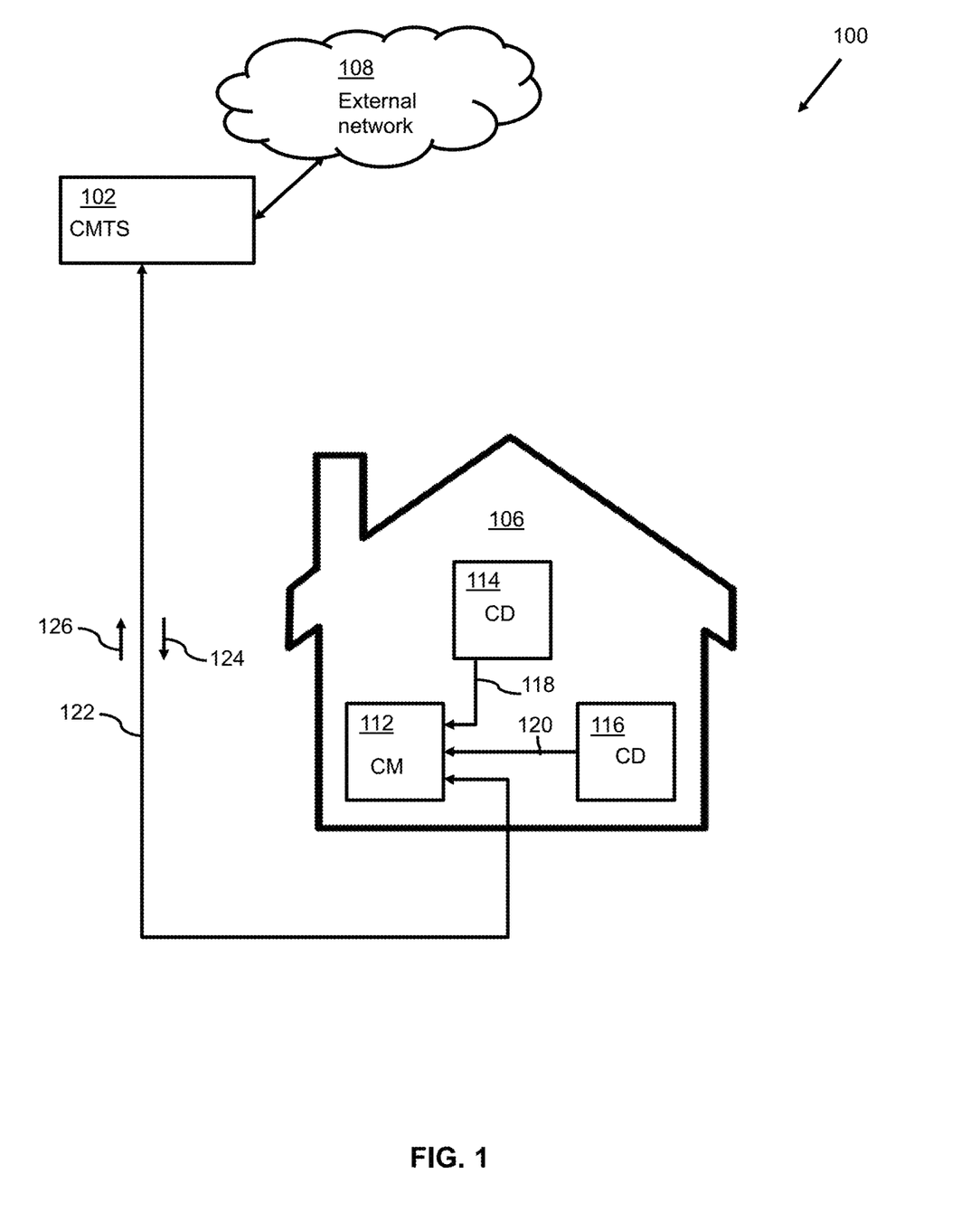
FIG. 1 illustrates a communication system.

FIG. 1 illustrates a communication system 100.

As shown in the figure, communication system 100 includes a cable modem termination system (CMTS) 102, a residence 106, an external network 108, a cable modem (CM) 112, a client device (CD) 114, a CD 116, communication channels 118, 120, and 122, a downstream service flow 124, and an upstream service flow 126. CM 112 is able to connect to external network 108 through communication channel 122 and CMTS 102.

CMTS 102 includes a processor and a memory, together for which provide data services via downstream service flow 124 to CM 112 and upstream service flow 126 from CM 112.

CM 112 is an electronic device that is to be located so as to establish a local area network (LAN) at a consumer premises. The consumer premises can include a residential dwelling, office, or any other business space of a user. The terms home, office, and premises may be used synonymously herein.

CM 112 may be any device or system that is operable to allow data to flow to a discrete network, which in this example is external network 108, e.g., the Internet. CM 112 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

CM 112 is able to communicate wirelessly with CD 114 and 116.

CD 114 and 116 may be a desk top computer, a laptop computer, an electronic tablet device, a smart phone, an appliance, or any other so called internet of things (IoT) equipped device that is equipped to communicate information.

For example, for purposes of the discussion presume that in residence 106 there are two residents; one is using CD 114 and the other is using CD 116. Further, presume that CD 114 is having a virtual work meeting, while CD 116 is being used to play an online video game. The video game being played on CD 116 is consuming sufficient bandwidth to reduce the bandwidth used by the virtual work meeting on CD 114, thereby reducing the quality of service (QoS) of the virtual work meeting on CD 114.

Due to the COVID-19 pandemic, and the increase in people working from home, more devices are being used in home networks at one time. Each device connected to the internet potentially decreases the overall QoS. However, certain events require high QoS, such as a virtual work meeting, a virtual class, online work, etc. These events demand high bandwidth, but in instances where both events occur at one time, one may take priority over the other. The abundance of devices lowering the QoS poses a problem for these important events. These events need to be given a higher priority to ensure that they are getting the high QoS that they need.

What is needed is a system and method for optimizing bandwidth allocation.

A system and method in accordance with the present disclosure optimizes bandwidth allocation.

In accordance with the present disclosure, a user uses an interface to associate some, more important applications, to a higher level QoS, during specific time periods. More specifically, a user may determine whether a specific application, e.g., a video conference application that is to be executed on a desktop computer, should be given a higher QoS than another application, for example a video game. Further, the user may determine when the specific application should have the higher level QoS. Therefore, for example, instead of a specific video conference application being assigned a high QoS at all times, the video conference application may be assigned the high QoS only at specific times of the day, or at specific days.

For example, consider a video conference application that may be executed on a desktop computer, wherein the video conference application is used by a parent for work between 8:00 am and 2:00 pm daily, but is also used in the evening by a child. In accordance with aspects of the present disclosure, the video conference application may be assigned a higher QoS between 8:00 am and 2:00 pm daily, but not after 2:00 pm because the use of the application by the parent is deemed more important that the use by the child in the evening. Therefore, between 8:00 am and 2:00 pm daily, packets from the video conference application will be assigned to a queue of a high QoS, whereas packets from other applications during that time period will be assigned to another queue of a low QoS.

An example system and method for optimizing bandwidth allocation in accordance with aspects of the present disclosure will now be described in greater detail with reference to FIGS. 2-9.

Figure 2:
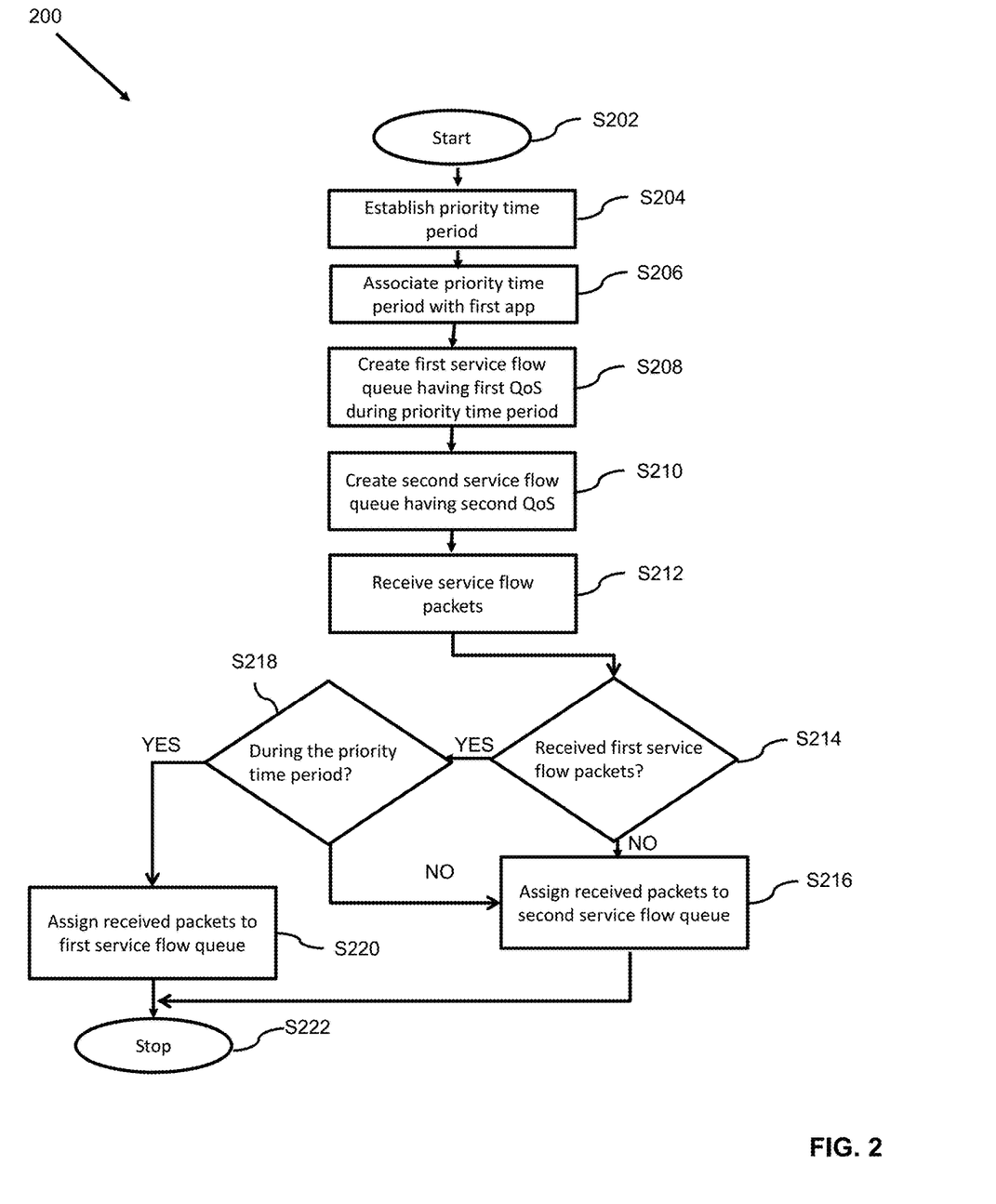
FIG. 2 illustrates a method of optimizing bandwidth allocation in accordance with aspects of the present disclosure.

FIG. 2 illustrates an algorithm 200 to be executed by a processor of optimizing bandwidth allocation.

As shown in the figure, algorithm 200 starts (S202), and the priority time period is established (S204). This will be described in greater detail with reference to FIGS. 3 and 4.

Figure 3:
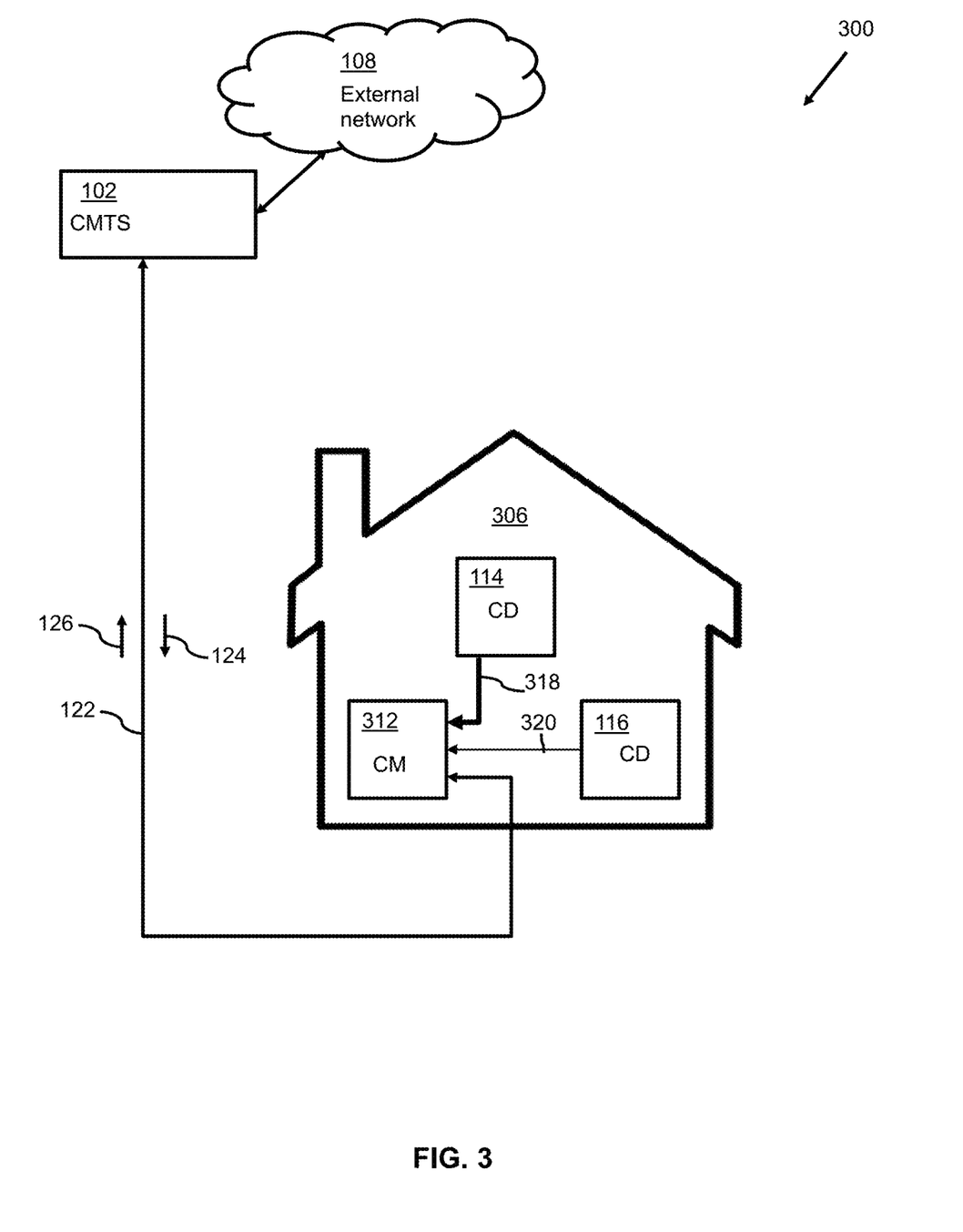
FIG. 3 illustrates a communication system in accordance with aspects of the present disclosure.

FIG. 3 illustrates a communication system 300.

As shown in the figure, communication system 300 includes CMTS 102, residence 106, external network 108, a cable modem (CM) 312, CD 114, and CD 116, communication channels 318, 320, and 122, downstream service flow 124, and upstream service flow 126.

Figure 4:
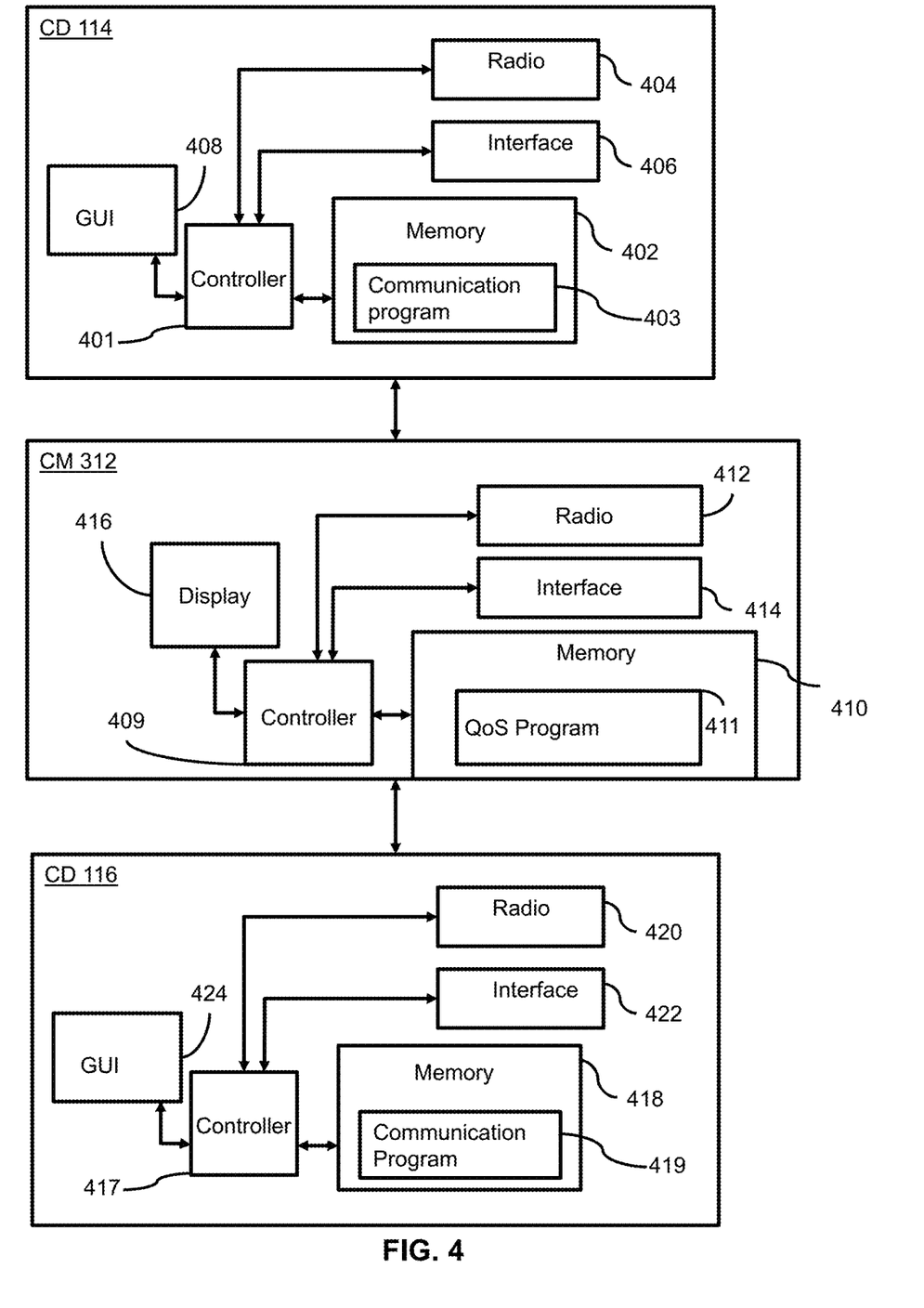
FIG. 4 illustrates an exploded view of a client device (CD), a cable modem (CM), and a CD in accordance with aspects of the present disclosure.

FIG. 4 illustrates an exploded view of CD 114, CM 312, and CD 116.

CD 114 includes a controller 401, a memory 402, which has stored therein communication program 403, radio 404, interface 406, and graphic user interface (GUI) 408.

In this example, controller 401, memory 402, radio 404, and interface 406 are illustrated as individual devices. However, in some embodiments, at least two of controller 401, memory 402, radio 404, and interface 406 may be combined as a unitary device. Further, in some embodiments, at least one of controller 401 and memory 402 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an ASIC, or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 401 may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of CD 114 in accordance with the embodiments described in the present disclosure.

Memory 402 can store various programming, and user content, and data including communication program 403. Communication program 403 includes instructions that, when executed by controller 401, cause CD 114 to communicate with CM 312.

Radio 404 may include a Wi-Fi WLAN interface radio transceiver that is operable to communicate with CM 312, as shown in FIG. 3. Radio 404 include one or more antennas and communicate wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. CD 114 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Interface circuit 406 can include one or more connectors, such as RF connectors, or Ethernet connectors, and/or wireless communication circuitry, such as 5G circuitry and one or more antennas.

GUI 408 may be any device or system that is operable to enable a user to access and control controller 401. GUI 408 may include a display to graphically display a user interface that may additionally include one or more layers including a human-machine interface (HMI) machines with physical input hardware such as keyboards, mice, game pads and output hardware such as computer monitors, speakers, and printers. Additional UI layers in GUI 408 may interact with one or more human senses, including: tactile UI (touch), visual UI (sight), and auditory UI (sound).

CM 312 includes: a HNC 409; a memory 410, which has stored therein a QoS program 411; a radio 412; an interface 414; and a display 416.

In this example, HNC 409, memory 410, radio 412, interface 414, and display 416 are illustrated as individual devices. However, in some embodiments, they may be combined as a unitary device. Further, in some embodiments, HNC 409 and memory 410 may be implemented as a computer having tangible computer-readable media for carrying or having computer-executable instructions or data structures stored thereon.

HNC 409 may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of CD 114 in accordance with the embodiments described in the present disclosure.

Memory 410 can store various programming and configuration such as QoS program 411. As will be described in greater detail below, QoS program 411 includes instructions that, when executed by HNC 409, cause CM 312 to: establish a priority time period; associate the priority time period with a first application; establish a first upstream queue having a first quality of service during the priority time period; establish a second upstream queue having a second quality of service that is different from the first quality of service during the priority time period; establish a first downstream queue having the first quality of service during the priority time period; establish a second downstream queue having the second quality of service during the priority time period; receive the first upstream packets and the second upstream packets; assign the first upstream packets to the first upstream queue during the priority time period; assign the second upstream packets to the second upstream queue during the priority time period; receive the first downstream packets and the second downstream packets; assign the first downstream packets to the first downstream queue during the priority time period; and assign the second downstream packets to the second downstream queue during the priority time period.

In some embodiments, as will be described in greater detail below, QoS program 411 includes instructions that, when executed by HNC 409, cause CM 312 to assign the first upstream packets to the first upstream queue during the priority time period by way of a deep packet inspection protocol.

In some embodiments, as will be described in greater detail below, QoS program 411 includes instructions that, when executed by HNC 409, cause CM 312 to: assign the first upstream packets and the second upstream packets to a same one of the first upstream queue and the second upstream queue during a non-priority time period that is not during the priority time period; and assign the first downstream packets and the second downstream packets to the same one of the first downstream queue and the second downstream queue during the non-priority time period.

Radio 412 may include a Wi-Fi WLAN interface radio transceiver that is operable to communicate with CD 114 and 116. Radio 412 may include one or more antennas to communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Cable modem 312 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Returning to FIG. 4, CD 116 behaves in a similar manner to that of CD 114, and has the same working components as CD 114. Therefore, for purposes of brevity, the specific details of CD 116 will not be further described.

With reference to FIGS. 2, 3, and 4, presume that in residence 306 there are two residents; one is using CD 114 and the other is using CD 116. Further, presume that CD 114 is used to conduct a virtual work meeting, while CD 116 is being used to play an online video game. To ensure that CD 114 has high QoS for the virtual work meeting, the user will use GUI 408 to cause controller 401 to execute instructions stored on communication program 403 to contact CM 312. CM 312 then causes HNC 409 to execute instructions stored on QoS program 411 to establish a priority time period for the application associated with the virtual work meeting. This established time period will be stored in memory 410 of CM 312. In some embodiments, the time period may be for a specific time of day, e.g., 8:00 am through 2:00 μm. In some embodiments, the time period may be for specific days, e.g., Monday through Friday.

Returning to FIG. 2, after the priority time period is established (S204), the priority time period is associated with the first application (S206). For example, after the resident creates a priority time period through CM 312 and stores the time period in memory 410, HNC 409 will execute instructions stored on QoS program 411 to cause CM 312 to associate the priority time period with the virtual work meeting being ran on CD 114. Once the virtual work meeting is associated with the priority time period, the association will be stored in memory 410. CM 312 is now searching for data packets from the virtual work meeting associated with CD 114 during the priority time period.

Returning to FIG. 2, after the priority time period is associated with the first application (S206), the first service flow queue having the first quality of service during priority time period is created (S208). For example, now that CM 312 has prioritized the virtual work meeting associated with CD 114 to receive a higher QoS during the priority time period, HNC 409 will execute instructions stored on QoS program 411 to cause CM 312 to create a first service flow queue.

Returning to FIG. 2, after the first service flow queue having the first quality of service during priority time period is created (S208), a second service flow queue having a second quality of service is created (S210). For example, as CM 312 creates a first service flow queue, a second service flow queue.

When CD 114 or CD 116 want to communicate with external network 108 through CMTS 102, each device will send data packets from applications to CM 312. CM 312 will send these data packets up to CMTS 102 through communication channel 122 by way of upstream service flow 126, which are then passed onto external network 108. External network 108 will return data packets down to CMTS 102, which sends them through communication channel 122 by way of downstream service flow 124 to CM 312. CM 312 will then distribute the correct data packets to CD 114 and 116. However, during the priority time period, CM 312 will create a priority queue that prioritizes data packets from CD 114, as well as data packets to CD 114. Conversely, data packets from CD 116 and data packets to CD 116 will not be prioritized in the queue, as no application associated with CD 116 is associated with the priority time period.

Returning to FIG. 2, after a second service flow queue having a second quality of service is created (S210), service flow packets are received (S212). For example, with both service flow queues now created, CM 312 will start receiving the data packets from external network 108 addressed to CD 114 and 116, as well as data packets from CD 114 and 116 addressed to external network 108. For purposes of brevity, we will be only discussing upstream service flow communications. However, it should be noted that similar operations will be used for downstream service flow communication.

For purposes of the discussion, more specifically with reference to FIG. 4, presume that CD 114 is executing a virtual work meeting. As such, controller 401 is executing instructions stored on communication program 403 that causes radio 404 to transmit a stream of virtual work meeting data packets to radio 412 of CM 312. Similarly, for purposes of the discussion, CD 116 is executing a video game program. As such, controller 417 is executing instructions stored on communication program 419 that causes radio 420 to transmit a stream of video game data packets to radio 412 of CM 312.

Returning to FIG. 2, after service flow packets are received (S212), then it is determined if the received packets are from the first service flow (S214). This will be described in greater detail with reference to FIG. 5.

Figure 5:
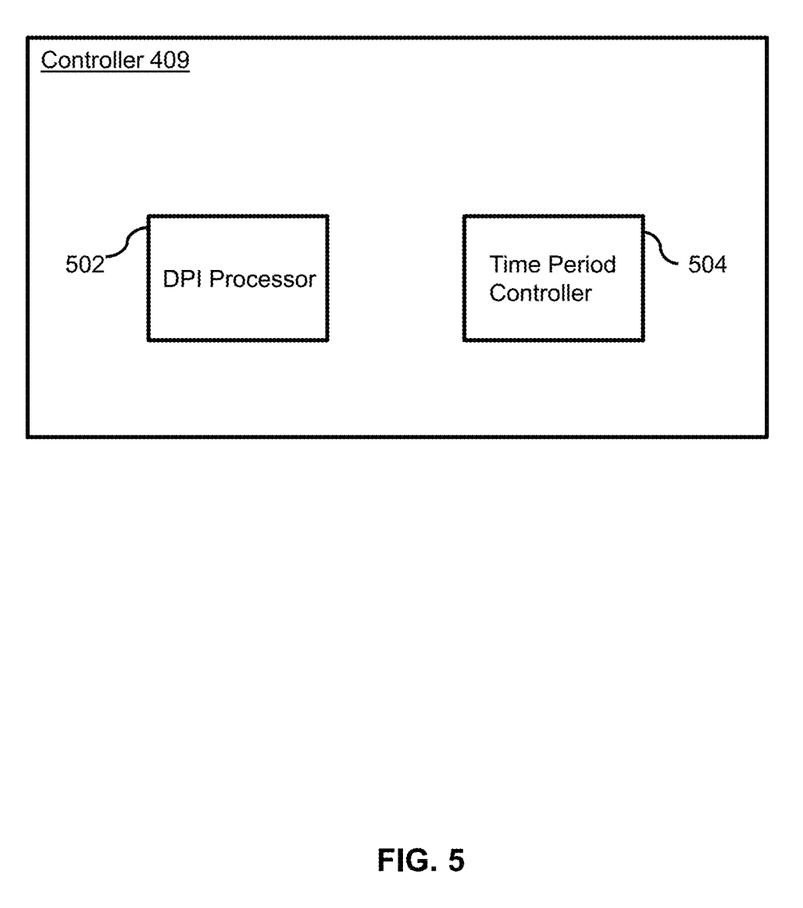
FIG. 5 illustrates an exploded view of a home network controller (HNC) from a CM in accordance with aspects of the present disclosure.

FIG. 5 illustrates an exploded view of HNC 409 from CM 312.

As shown in the figure, HNC 409 contains a deep packet inspector (DPI) processor 502 and a time period controller 504.

Though DPI processor 502 and time period controller 504 are shown separately, they may be combined into a unitary device or implemented as a program running on HNC 409.

DPI processor 502 inspects the data packets flowing into CM 312.

Time period controller 504 will determine whether the packets flowing are high QoS or low QoS within the priority time period.

With reference to FIG. 5, for purposes of the discussion, presume that a resident is using CD 116 to play an online video game. DPI processor 502 will inspect the packets flowing in, and recognize that they are for the online video game. Time period controller 504 will then determine which service flow queue the online video game should be associated.

Returning to FIG. 2, if it is determined that the received packets are not from the first service flow (NO at S214), then the received packets are assigned to the second service flow queue (S216). For example, if time period controller 504 determines that the online video game being played on CD 116 is not associated with the priority time period, the packets received by DPI processor 502 will be assigned to the second service flow queue.

Returning to FIG. 2, after the received packets are assigned to the second service flow queue (S216), algorithm 200 stops (S222). For example, once time period controller 504 assigns the packets associated with CD 116 to the second service flow queue, algorithm 200 will stop.

Returning to FIG. 2, if it is determined that the received packets are from the first service flow (YES at S214), it is determined if they were received during the priority time period (S218). This will be described in greater detail with reference to FIGS. 6 and 7.

Figure 6:
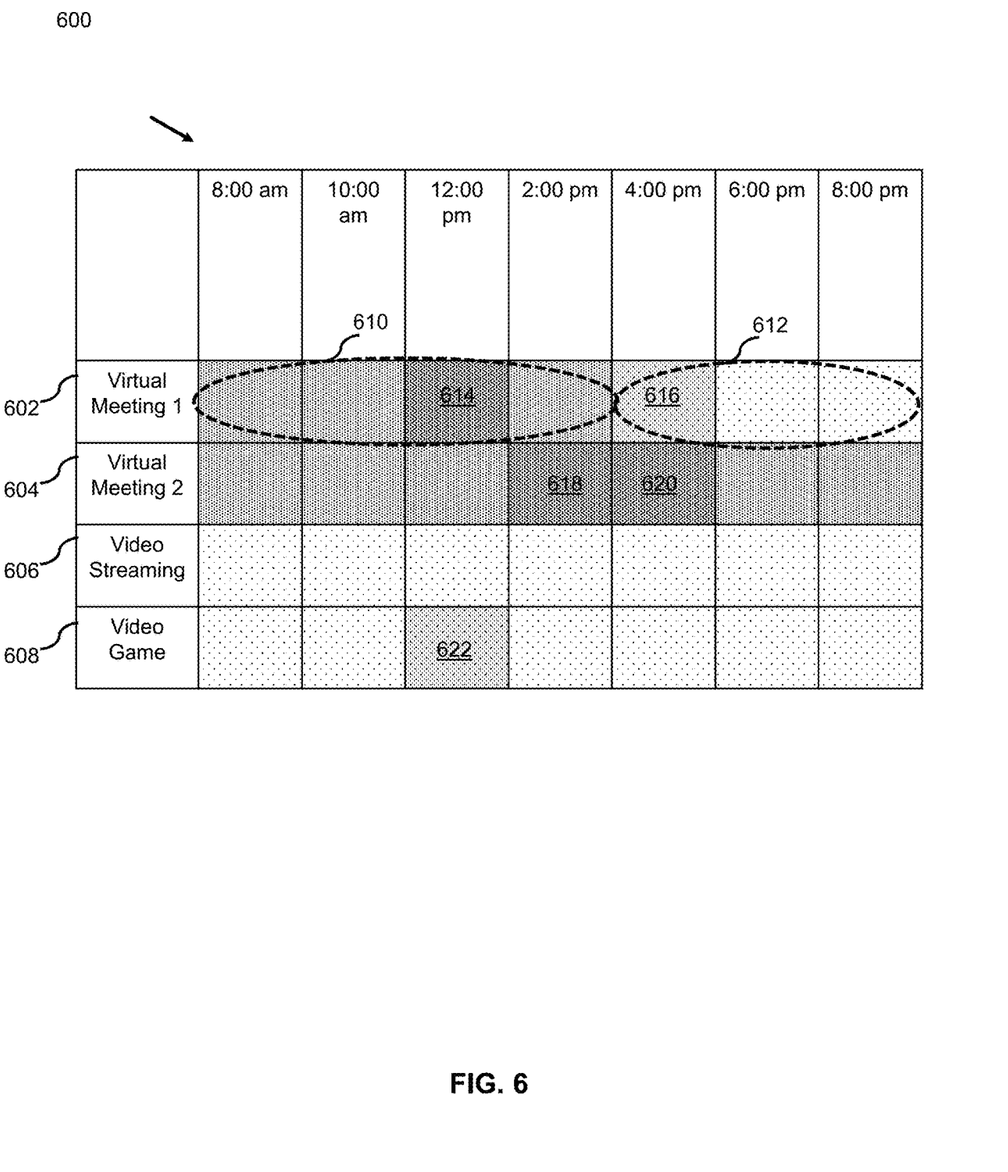
FIG. 6 illustrates a table in accordance with aspects of the present disclosure.

FIG. 6 illustrates a table 600.

As shown in the figure, table 600 includes a plurality of time columns, a virtual meeting row 602, virtual meeting row 604, a video streaming row 606, a video game row 608, a priority time period 610, a non-priority time period 612, and time periods 614, 616, 618, 620, and 622.

The lightly-shaded boxes at the right end of virtual meeting row 602, video streaming row 606, and video game row 608 indicate a low QoS. The darker-shaded boxes of virtual meeting row 602 and virtual meeting row 604 indicate a high QoS. The shaded time periods 616 and 622 indicate that the application is active during the non-priority time period. The shaded time periods 614, 618, and 620 indicate that the application is currently active in the priority time period.

As shown in the figure, virtual meeting row 602 is associated with priority time period 610, which lasts from 8:00 AM to 4:00 PM. Virtual meeting row 602 is then associated with non-priority time period 612, which lasts from 4:00 PM to 10:00 PM. Virtual meeting row 604 is associated with the priority time period from 8:00 AM to 10:00 PM. Both video streaming row 606 and video game row 608 are associated with the non-priority time period from 8:00 AM to 10:00 PM.

FIG. 6 also shows that virtual meeting row 602 is active at time period 614, during priority time period 610. This allows the virtual meeting active during time period 614 to have high QoS. However, virtual meeting row 602 also is active at time period 616, which is associated with non-priority time period 612. This gives the virtual meeting active during time period 616 low QoS. As virtual meeting row 604 is associated with priority time period during the entire time frame, both virtual meetings associated with time period 618 and 620 have high QoS. Video game row 608 is active during time period 622, but is associated with non-priority time period, so it receives low QoS.

With reference to FIGS. 2, 5, and 6, DPI processor 502 inspects the data packets flowing in, and recognizes that they are for the virtual work meeting associated with CD 114. Time period controller 504 then recognizes that CD 114, shown as virtual meeting row 602, is associated with the priority time period 610.

Figure 7:
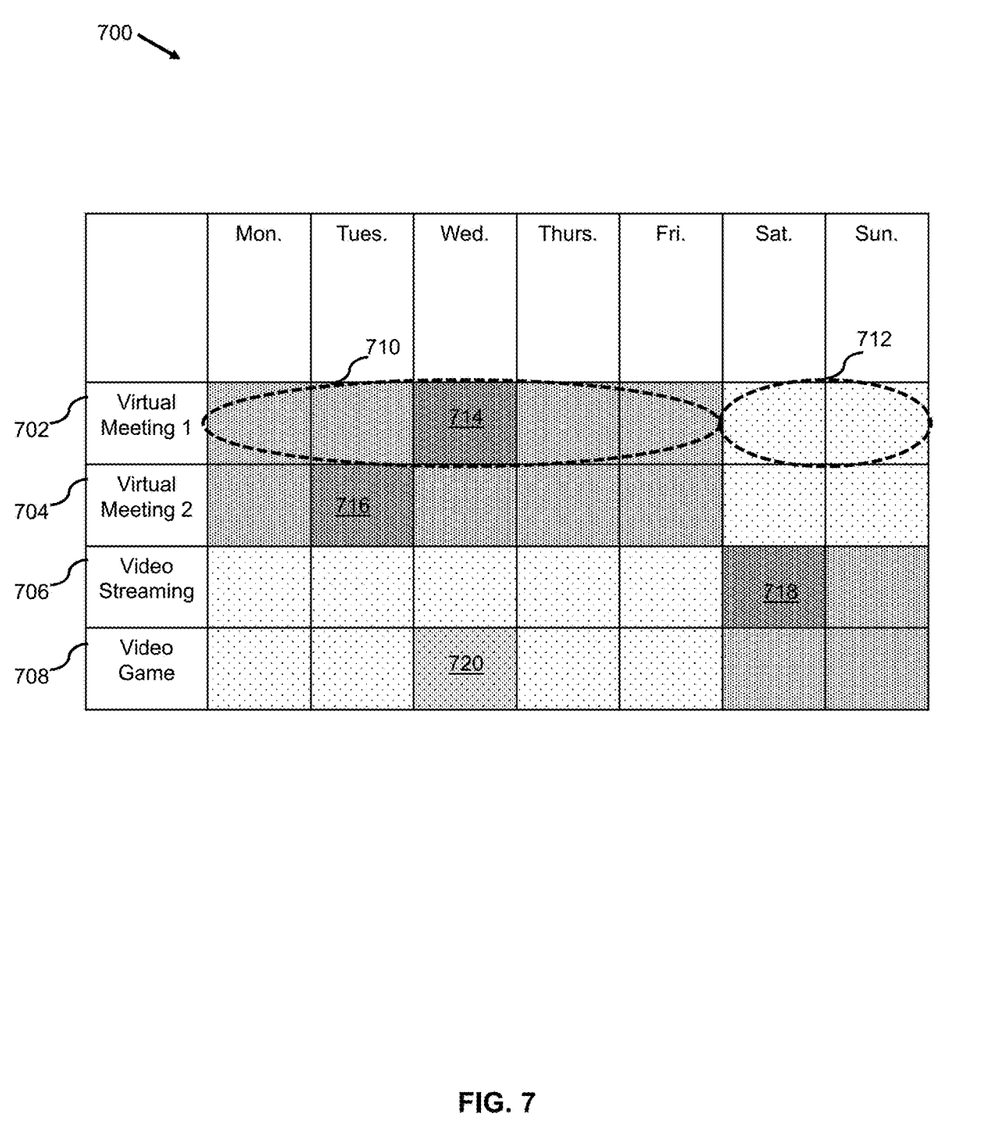
FIG. 7 illustrates a table in accordance with aspects of the present disclosure.

FIG. 7 illustrates a table 700.

As shown in the figure, table 700 includes a plurality of day columns, a virtual meeting row 702, virtual meeting row 704, a video streaming row 706, and a video game row 708, a priority time period 710, a non-priority time period 712, and time periods 714, 716, and 718.

The lightly-shaded boxes at the right end of virtual meeting row 702, at the right end of virtual meeting row 704, video streaming row 706, and video game row 708 indicate a low QoS. The darker-shaded boxes of virtual meeting row 702, virtual meeting row 704, at the right end of video streaming row 706, and at the right end of video game row 708 indicate a high QoS. The shaded time period 720 indicates that the application is active during the non-priority time period. The shaded time periods 714, 716, and 718 indicate that the application is currently active in the priority time period.

As shown in the figure, virtual meeting row 702 is associated with priority time period 710, which lasts from Monday to Friday. Virtual meeting row 702 is then associated with non-priority time period 712, which lasts from Saturday to Sunday. Virtual meeting row 704 is associated with the same priority time period and non-priority time period. Both video streaming row 606 and video game row 608 are associated with the non-priority time period from Monday to Friday, and the priority time period from Saturday to Sunday.

FIG. 7 also shows that virtual meeting row 702 is active at time period 714, during priority time period 710. This allows the virtual meeting active during time period 714 to have high QoS. Virtual meeting row 604 is associated with the priority time period during from Monday to Friday, so the virtual meeting associated with time period 716 has high QoS. Video streaming row 706 is active during time period 718 which is associated with the priority time period, so it receives high QoS. Video game row 708 is active during time period 720, which receives low QoS as it is associated with the non-priority time period.

With reference to FIGS. 2, 5, and 7, DPI processor 502 inspects the data packets flowing in, and recognizes that they are for the virtual work meeting associated with CD 114. Time period controller 504 then recognizes that CD 114, shown as virtual meeting row 702, is associated with the priority time period 710.

Returning to FIG. 2, if it is determined that they were not received during the priority time period (NO at S218), then the received packets are assigned to the second service flow queue (S216). For example, if the packets received by DPI processor 502 were for CD 114, but not during the priority time period, time period controller 504 will assign the packets to second service flow queue.

Returning to FIG. 2, if it is determined that they were received during the priority time period (YES at S218), then the received packets are assigned to the first service flow queue (S220). This will be described in greater detail with reference to FIGS. 8 and 9.

Figure 8:
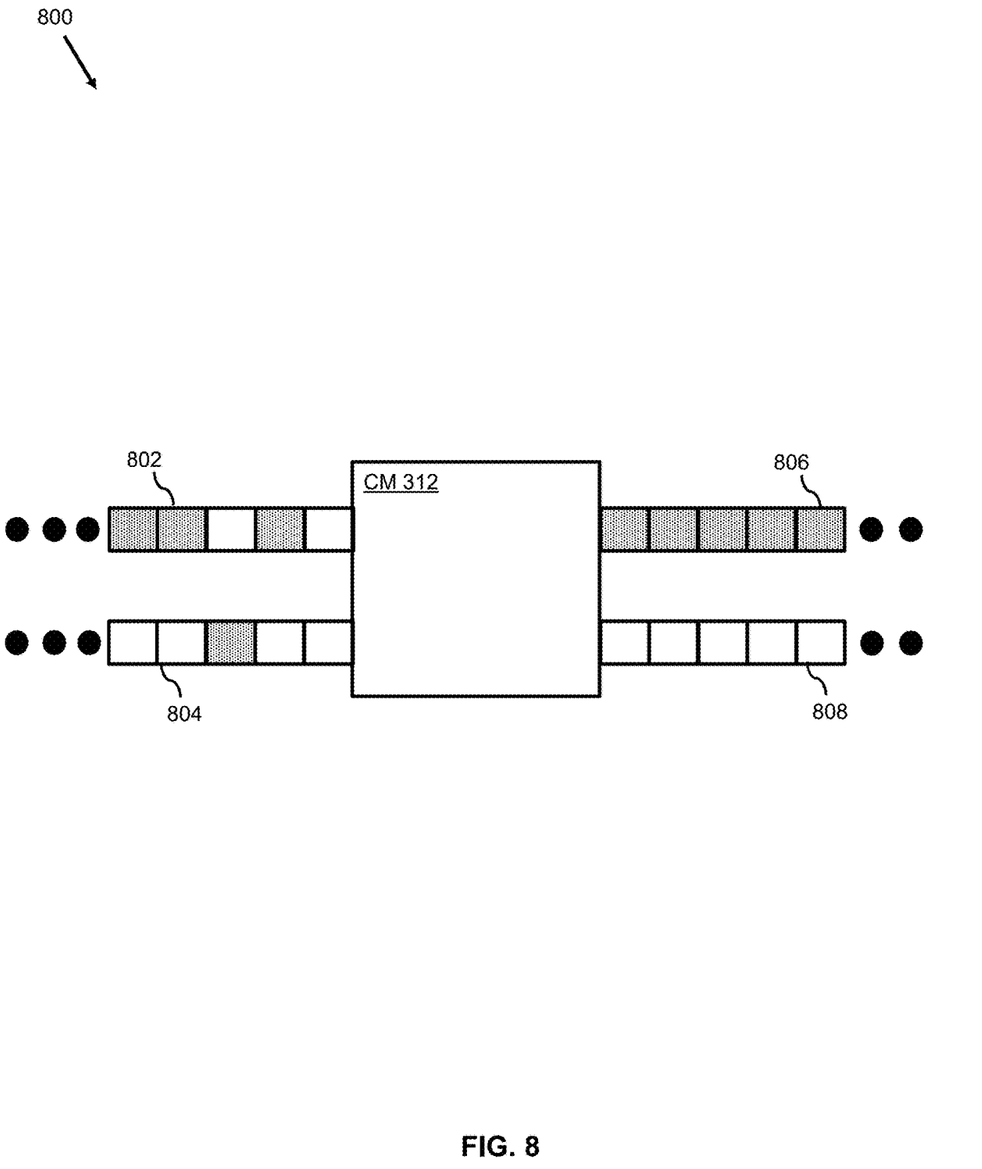
FIG. 8 illustrates the operation of a CM in one sample embodiment in accordance with aspects of the present disclosure.

FIG. 8 illustrates an upstream operation of CM 312 in one sample embodiment. The shaded boxes imply high QoS, and the unshaded boxes imply low QoS.

As shown in the figure, cable modem 312 is configured to receive a first packet stream 802 and a second packet stream 804, and to output high QoS packet stream 806 and low quality packet stream 808. First packet stream 802 is received from CD 116 and is directed to external network 108, wherein CM 312 will transmit the packets from first packet stream 802 to external network 108 via a first upstream service flow. Similarly, second packet stream 804 is received from CD 114 and is directed to external network 108, wherein CM 312 will transmit the packets from first packet stream 802 to external network 108 via a second distinct upstream service flow. In other words, as a modification to the system discussed above with reference to FIG. 3, in this embodiment, CMTS 102 has established a first upstream/downstream service flow to support a higher QoS and a second upstream/downstream service flow to support a lower QoS. The first QoS upstream/downstream service flow may have a QoS that is higher than the second QoS upstream/downstream service flow by providing a higher bandwidth, a lower latency or a combination thereof.

With reference to FIGS. 2, 6, and 8, presume that CD 116 has two applications active: virtual meeting application associated with virtual meeting row 602 and video game application associated with video game row 608. As shown in FIG. 6, both of these applications are active at 12:00 PM. During this time, virtual meeting application is associated with the priority time period as shown in virtual meeting row 602, and video game application is associated with the non-priority time period. CD 116 is producing first packet stream 802. Similarly, CD 114 is associated with second packet stream 804, and uploads high QoS for its prioritized applications, and low QoS data packets for its non-prioritized applications. As shown in the figure, CM 312 is receiving high QoS data packets from first packet stream 802 by way of the virtual meeting application as shown in row 602, and low QoS data packets from second packet stream 802 by way of the video game application as shown by row 608. In this sample embodiment, CM 312 will then transmit the high QoS data packets as high QoS packet stream 806. The low QoS data packets will be transmitted as low QoS packet stream 808.

FIG. 8 illustrates upstream service flows in accordance with aspects of the present disclosure. It should be noted that a similar downstream service flows will be received from external network 108, which will include packets addressed to CD 114 and CD 116. In accordance with aspects of the present disclosure, CM 312 may identify each packet received in the downstream service flows by way of deep packet inspection to determine both, to which of CD 114 and CD 116 to send the packet, and to determine whether the packet should receive the high QoS or the low QoS, in a manner discussed above.

In the example embodiment discussed above with reference to FIG. 8, each QoS is assigned to a respective distinct upstream/downstream service flow. However, in other embodiments, a single service flow may support multiple QoS assignments. This will be described in greater detail with reference to FIG. 9.

Figure 9:
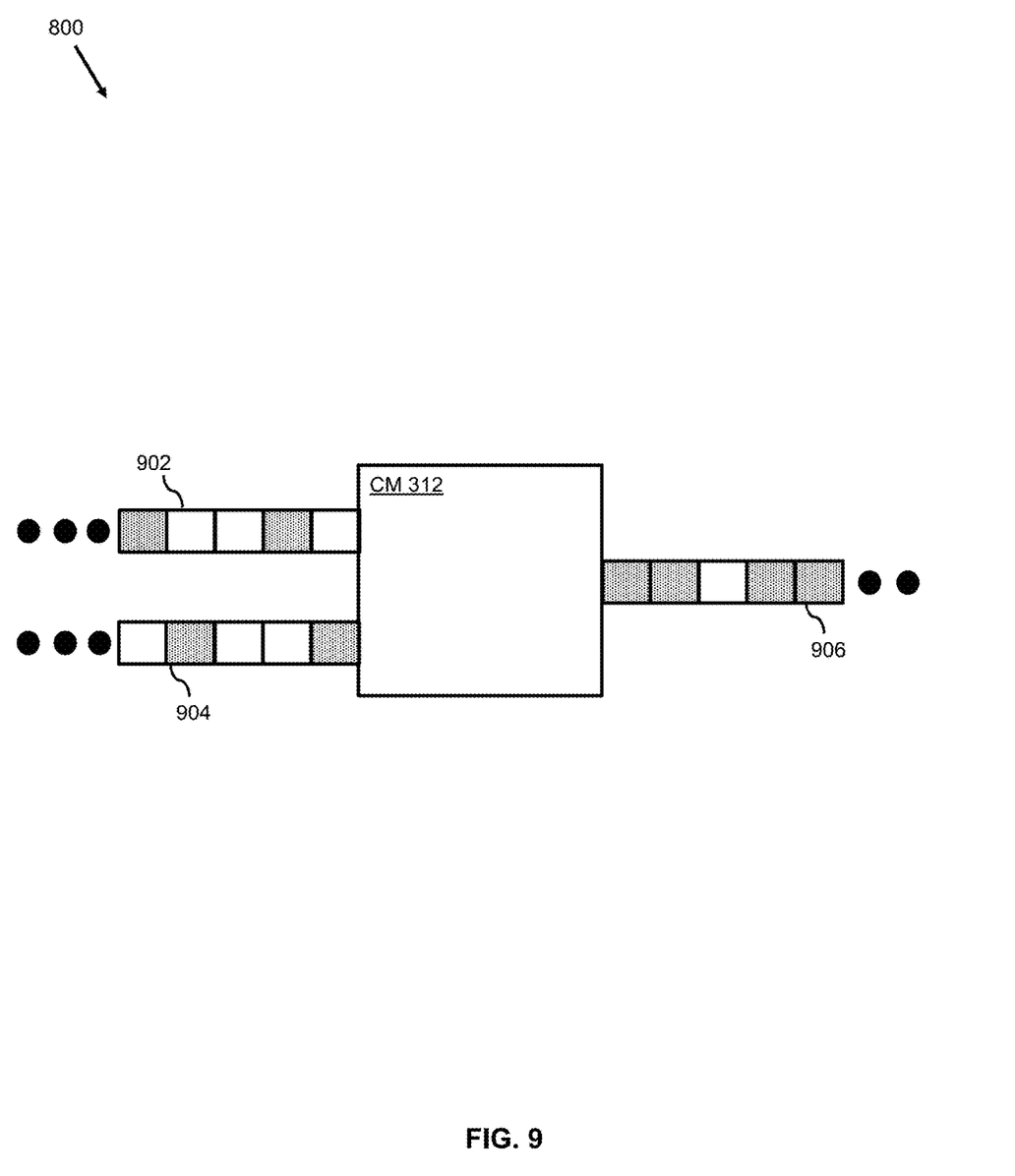
FIG. 9 illustrates the operation of a CM in one sample embodiment in accordance with aspects of the present disclosure.

FIG. 9 illustrates the operation of CM 312 in one sample embodiment. The shaded boxes imply high QoS, and the unshaded boxes imply low QoS.

As shown in the figure, cable modem 312 is configured to receive a first packet stream 902 and a second packet stream 904, and to output a packet stream 906. First packet stream 902 is received from CD 116 and is directed to external network 108, wherein CM 312 will transmit the packets from first packet stream 902 to external network 108 via a single upstream service flow. Similarly, second packet stream 904 is received from CD 114 and is directed to external network 108, wherein CM 312 will transmit the packets from first packet stream 902 to external network 108 via the same upstream service flow.

With reference to FIGS. 2, 6, and 9, presume that CD 116 has two applications active: virtual meeting row 602 and video game row 608. Both of these applications are active at the time of 12:00 PM. During this time, virtual meeting row 602 is associated with the priority time period, and video game row 608 is associated with the non-priority time period. CD 116 is associated with first packet stream 902. As shown in the figure, first packet stream 902 is uploading high QoS data packets to CM 312 by way of the virtual meeting application as shown in row 602, and low QoS data packets to CM 312 by way of the video game application as shown in row 608. Similarly, CD 114 is associated with second packet stream 904, and uploads high QoS for its prioritized applications, and low QoS data packets for its non-prioritized applications. CM 312 has a single packet stream, represented by packet stream 906. This packet stream prioritizes uploading the high QoS data packets to CMTS 102.

FIG. 9 illustrates the upstream service flow in accordance with aspects of the present disclosure. It should be noted that a similar downstream service flow will be received from external network 108, which will include packets addressed to CD 114 and CD 116. In accordance with aspects of the present disclosure, CM 312 may identify each packet received in the downstream service flow by way of deep packet inspection to determine both, to which of CD 114 and CD 116 to send the packet, and to determine whether the packet should receive the high QoS or the low QoS, in a manner discussed above.

A non-limiting example of how to prioritize high QoS data packets may include increasing the bandwidth. For example, CM 312 may allot two high QoS data packets for every one low QoS data packet.

In some embodiments, with reference to FIGS. 8 and 9, CM 312 may have more than two devices connected to it, in which there would be more than two packet streams.

Returning to FIG. 2, after the received packets are assigned to the first service flow queue (S220), algorithm 200 stops (S222). For example, once the received data packets are correctly assigned to the first service flow queue during the priority time period, algorithm 200 stops.

In the non-limiting example embodiments discussed above, a high QoS is distinguished from a low QoS. It should be noted that there may be multiple levels of QoS in accordance with aspects of the present disclosure.

Due to the COVID-19 pandemic, and the increase in people working from home, more devices are being used in home networks at one time. Each of these devices compete with one another for high QoS. However, certain events require high QoS, such as a virtual work meeting, a virtual class, online work, etc. These events should have high QoS over trivial events, such as streaming a video, or playing an online video game. It is important that these important events get the high QoS they need while they are happening.

In accordance with the present disclosure, a user will use an interface to associate a particular application, during a particular time period to a QoS priority. If the particular application is executed during the associated time period, high QoS is allocated for packets associated with the applications. The data packets are identified by way of deep packet inspection and put into a high priority queue, while the rest of the data packets are put into a low priority queue.

Thus, the present disclosure as disclosed allocates high QoS data packets to applications during time periods where they are active and low QoS data packets to applications otherwise.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A home network controller for use with a client device, a wide area network ("WAN"), and a service provider server, the client device being configured to transmit first upstream packets associated with a first application, and to transmit second upstream packets associated with a second application, the service provider server being configured to receive the first upstream packets, to receive the second upstream packets, to transmit first downstream packets associated with the first application, and to transmit second downstream packets associated with the second application, the client device being additionally configured to receive the first downstream packets, and to receive the second downstream packets, said home network controller comprising:

a memory; and a processor configured to execute instructions stored on said memory to cause said home network controller to:

establish a priority time period;

associate the priority time period with the first application;
establish a first upstream queue having a first quality of service during the priority time period;
establish a second upstream queue having a second quality of service that is different from the first quality of service during the priority time period;
establish a first downstream queue having the first quality of service during the priority time period;
establish a second downstream queue having the second quality of service during the priority time period;
receive the first upstream packets and the second upstream packets;
assign the first upstream packets to the first upstream queue during the priority time period;
assign the second upstream packets to the second upstream queue during the priority time period;
receive the first downstream packets and the second downstream packets;
assign the first downstream packets to the first downstream queue during the priority time period; and
assign the second downstream packets to the second downstream queue during the priority time period.

2. The home network controller of claim 1, wherein said processor is configured to execute instructions stored on said memory to cause said home network controller further to assign the first upstream packets to the first upstream queue during the priority time period by way of a deep packet inspection protocol.

3. The service provider server of claim 1, wherein said processor is configured to execute instructions stored on said memory to cause said home network controller further to:
assign the first upstream packets and the second upstream packets to a same one of the first upstream queue and the second upstream queue during a non-priority time period that is not during the priority time period; and
assign the first downstream packets and the second downstream packets to the same one of the first downstream queue and the second downstream queue during the non-priority time period.

4. A method of using a home network controller with a client device, a wide area network ("WAN"), and a service provider server, the client device being configured to transmit first upstream packets associated with a first application, and to transmit second upstream packets associated with a second application, the service provider server being configured to receive the first upstream packets, to receive the second upstream packets, to transmit first downstream packets associated with the first application, and to transmit second downstream packets associated with the second application, the client device being additionally configured to receive the first downstream packets, and to receive the second downstream packets, said method comprising:
establishing, via a processor configured to execute instructions stored on a memory, a priority time period;
associating, via the processor, the priority time period with the first application;
establishing, via the processor, a first upstream queue having a first quality of service during the priority time period;
establishing, via the processor, a second upstream queue having a second quality of service that is different from the first quality of service during the priority time period;
establishing, via the processor, a first downstream queue having the first quality of service during the priority time period;
establishing, via the processor, a second downstream queue having the second quality of service during the priority time period;
receiving, via the processor, the first upstream packets and the second upstream packets;
assigning, via the processor, the first upstream packets to the first upstream queue during the priority time period;
assigning, via the processor, the second upstream packets to the second upstream queue during the priority time period;
receiving, via the processor, the first downstream packets and the second downstream packets;
assigning, via the processor, the first downstream packets to the first downstream queue during the priority time period; and
assigning, via the processor, the second upstream packets to the second downstream queue during the priority time period.

5. The method of claim 4, further comprising assigning, via the processor, the first upstream packets to the first upstream queue during the priority time period by way of a deep packet inspection protocol.

6. The method of claim 4, further comprising:
assigning, via the processor, the first upstream packets and the second upstream packets to a same one of the first upstream queue and the second upstream queue during a non-priority time period that is not during the priority time period; and
assigning, via the processor, the first downstream packets and the second downstream packets to the same one of the first upstream queue and the second upstream queue during the non-priority time period.

7. A non-transitory, computer-readable media having computer-readable instructions stored thereon, the computer-readable instructions being capable of being read by a home network controller for use with a client device, a wide area network ("WAN"), and a service provider server, the client device being configured to transmit first upstream packets associated with a first application, and to transmit second upstream packets associated with a second application, the service provider server being configured to receive the first upstream packets, to receive the second upstream packets, to transmit first downstream packets associated with the first application, and to transmit second downstream packets associated with the second application, the client device being additionally configured to receive the first downstream packets, and to receive the second downstream packets, wherein the computer-readable instructions are capable of instructing the home network controller to perform the method comprising:
establishing, via a processor configured to execute instructions stored on a memory, a priority time period;
associating, via the processor, the priority time period with the first application;
establishing, via the processor, a first upstream queue having a first quality of service during the priority time period;
establishing, via the processor, a second upstream queue having a second quality of service that is different from the first quality of service during the priority time period;
establishing, via the processor, a first downstream queue having the first quality of service during the priority time period;
establishing, via the processor, a second downstream queue having the second quality of service during the priority time period;

receiving, via the processor, the first upstream packets and the second upstream packets;

assigning, via the processor, the first upstream packets to the first upstream queue during the priority time period;

assigning, via the processor, the second upstream packets to the second upstream queue during the priority time period;

receiving, via the processor, the first downstream packets and the second downstream packets;

assigning, via the processor, the first downstream packets to the first downstream queue during the priority time period; and assigning, via the processor, the second upstream packets to the second downstream queue during the priority time period.

8. The non-transitory, computer-readable media of claim 7, wherein the computer-readable instructions are capable of instructing the home network controller to perform the method further comprising assigning, via the processor, the first upstream packets to the first upstream queue during the priority time period by way of a deep packet inspection protocol.

9. The non-transitory, computer-readable media of claim 7, wherein the computer-readable instructions are capable of instructing the home network controller to perform the method further comprising:

assigning, via the processor, the first upstream packets and the second upstream packets to a same one of the first upstream queue and the second upstream queue during a non-priority time period that is not during the priority time period; and assigning, via the processor, the first downstream packets and the second downstream packets to the same one of the first upstream queue and the second upstream queue during the non-priority time period.

* * * * *